United States Patent [19]
Goldberg et al.

[11] Patent Number: 5,655,117
[45] Date of Patent: Aug. 5, 1997

[54] METHOD AND APPARATUS FOR INDEXING MULTIMEDIA INFORMATION STREAMS

[75] Inventors: Evan Goldberg, San Francisco; Bo Yu, Belmont, both of Calif.

[73] Assignee: Oracle Corporation, Redwood Shores, Calif.

[21] Appl. No.: 719,308

[22] Filed: Sep. 24, 1996

Related U.S. Application Data

[63] Continuation of Ser. No. 342,422, Nov. 18, 1994, abandoned.

[51] Int. Cl.$^6$ ..................................................... G06F 17/30
[52] U.S. Cl. ............................................. 395/613; 395/615
[58] Field of Search ..................................... 395/613, 615

[56] References Cited

U.S. PATENT DOCUMENTS

| | | | |
|---|---|---|---|
| 3,898,438 | 8/1975 | Nater et al. | 395/99 |
| 5,123,088 | 6/1992 | Kasahara et al. | 395/159 |
| 5,195,092 | 3/1993 | Wilson et al. | 370/94.2 |
| 5,268,846 | 12/1993 | Bonsall et a. | 364/524 A |
| 5,278,946 | 1/1994 | Shimada et al. | 395/632 |
| 5,414,644 | 5/1995 | Seaman et al. | 364/551.01 |
| 5,434,971 | 7/1995 | Lysakowski, Jr. | 395/613 |
| 5,440,677 | 8/1995 | Case et al. | 395/154 |
| 5,446,842 | 8/1995 | Schaeffer et al. | 395/200.01 |
| 5,454,102 | 9/1995 | Tang et al. | 395/613 |
| 5,459,830 | 10/1995 | Ohba et al. | 395/152 |
| 5,550,965 | 8/1996 | Gabbe et al. | 395/154 |
| 5,559,707 | 9/1996 | DeLorme et al. | 364/443 |

OTHER PUBLICATIONS

Stevens, "Next Generation Network and Operating System Requirements for Continuous Time Media", in Herrtwich (Ed.), Network and Operating System Support for Digital Audio and Video, pp. 197–208, Nov. 1991.

Gong et al, "An Image Database System with Content Capturing and Fast Image Indexing Abilities", PROC of the International Conference on Multimedia Computing and Systems, pp. 121–130 May 19, 1994.

Salomon et al, "Using Guides to Explore Multimedia Databases", PROC of the Twenty–Second Annual Hawaii International Conference on System Sciences. vol. IV, 3–6 Jan. 1989, pp. 3–12 vol. 4. Jan. 6, 1989.

ImageMagick 3.0, 1994May16.014102.4756@eplrx7.es.duPont.com, from cristy@eplrx7.es.duPont.com, May 15, 1994.

Hongjiang, et al., Digital Libraries, "A Video Database System for Digital Libraries", pp. 253–264, May 1994.

S. Abe and Y. Tonomura, Systems and Computers in Japan, vol. 24, No. 7, "Scene Retrieval Method Using Temporal Condition Changes", pp. 92–101, 1993.

EPO Search Report, PCT/US95/15179, May 9, 1996.

*Primary Examiner*—Wayne Amsbury
*Attorney, Agent, or Firm*—Blakely, Sokoloff, Taylor & Zafman

[57] ABSTRACT

A system and method for indexing a multimedia stream to provide information regarding the content of the stream is disclosed. The present invention brings a new technology of representing, creating, and using additional information for the video stream, called video index, making possible the content-based retrieval to ease the video services. The present invention defines a portable and extensible multimedia file format for storing the media index including the video index, the media index file frame (MIFF), and provides a complete access toolkit for MIFF.

24 Claims, 7 Drawing Sheets

```
QUERYING AND SELECTING TARGETS IN VIDEO
INDEX FILES.
```

```
SCAN THE MIFF FILE FOR A LIST OF INDEXED
TARGETS. DISPLAY THE LIST OF TARGETS.
710
```

```
RECEIVE A TARGET SEARCH REQUEST.
712
```

```
SCAN THE REP CHUNKS IN THE MIFF FILE
FOR THE REQUESTED TARGET(S).
714
```

```
DISPLAY A LIST OF FRAMES IN WHICH THE
SELECTED TARGET IS PRESENT. IF
REQUESTED, DISPLAY THE FRAMES IN WHICH
THE SELECTED TARGET IS PRESENT.
716
```

```
EXIT
```

FIGURE 7

METHOD AND APPARATUS FOR INDEXING MULTIMEDIA INFORMATION STREAMS

This is a continuation of application Ser. No. 08/342,422, filed Nov. 18, 1994, now abandoned.

BACKGROUND OF THE INVENTION

1. Field of the Invention

The present invention relates to the field of multimedia. Specifically, the present invention relates to indexing multimedia information streams including audio and video streams.

2. Description of Related Art

With the rapid convergence of computer and telecommunication technologies, the time-based continuous digital media stream, such as motion video, becomes the major source of traffic on the information superhighway. Because of the isochronous nature of this media stream and its large volume, it is important to provide the means to effectively transport, parse, and deliver this information efficiently. Unfortunately, prior art media information streams, including audio and video streams, are opaque in their content. These streams are intended strictly for direct delivery to some type of output device, such as a display screen or audio speaker. Although these streams are digital, there is no conventional way to decode the content of the stream and learn any more than the color and/or the intensity of a collection of pixels. It would be advantageous to determine the presence of a particular object of interest in a media stream, such as a character, shape, or identifiable object. This presents a general challenge in providing the video services that is not met by the prior art.

Some prior art systems use a technique sometimes called hot spots. This technique defines regions of a video stream at some time in the video stream. These regions or hot spots are essentially soft buttons on the video display that can be activated in a manner similar to the prior art use of icons. This technique, however, does not associate objects in the video stream in a manner useful for searching or scanning the video stream. Further, hot spots typically do not support audio. Other prior art techniques provide a means for including paragraphs of text that describe a video stream. Again, however, this technique does not effectively support a searching or querying function.

Thus, a means and method for indexing a multimedia stream to provide information regarding the content of the stream is needed.

SUMMARY OF THE INVENTION

The present invention is a means and method for indexing a multimedia stream to provide information regarding the content of the stream. The present invention brings a new technology of representing, creating and using additional information for the video, called video index, making possible the content-based retrieval to ease the video services. The present invention defines a portable and extensible multimedia file format for storing the media index including the video index, the media index file frame (MIFF), and provides a complete access toolkit for MIFF.

DETAILED DESCRIPTION OF THE PREFERRED EMBODIMENT

The present invention is a means and method for indexing a multimedia stream to provide information regarding the content of the stream. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The present invention brings a new technology of representing, creating and using additional information for a video, audio, or other multimedia stream. This additional information is called a media index. The media index makes possible the content-based retrieval to ease the operation of multimedia services. The present invention defines a portable and extensible multimedia file format for storing the media index including a video index, the media index file frame (MIFF), and provides a complete access toolkit for MIFF.

Figure 1:
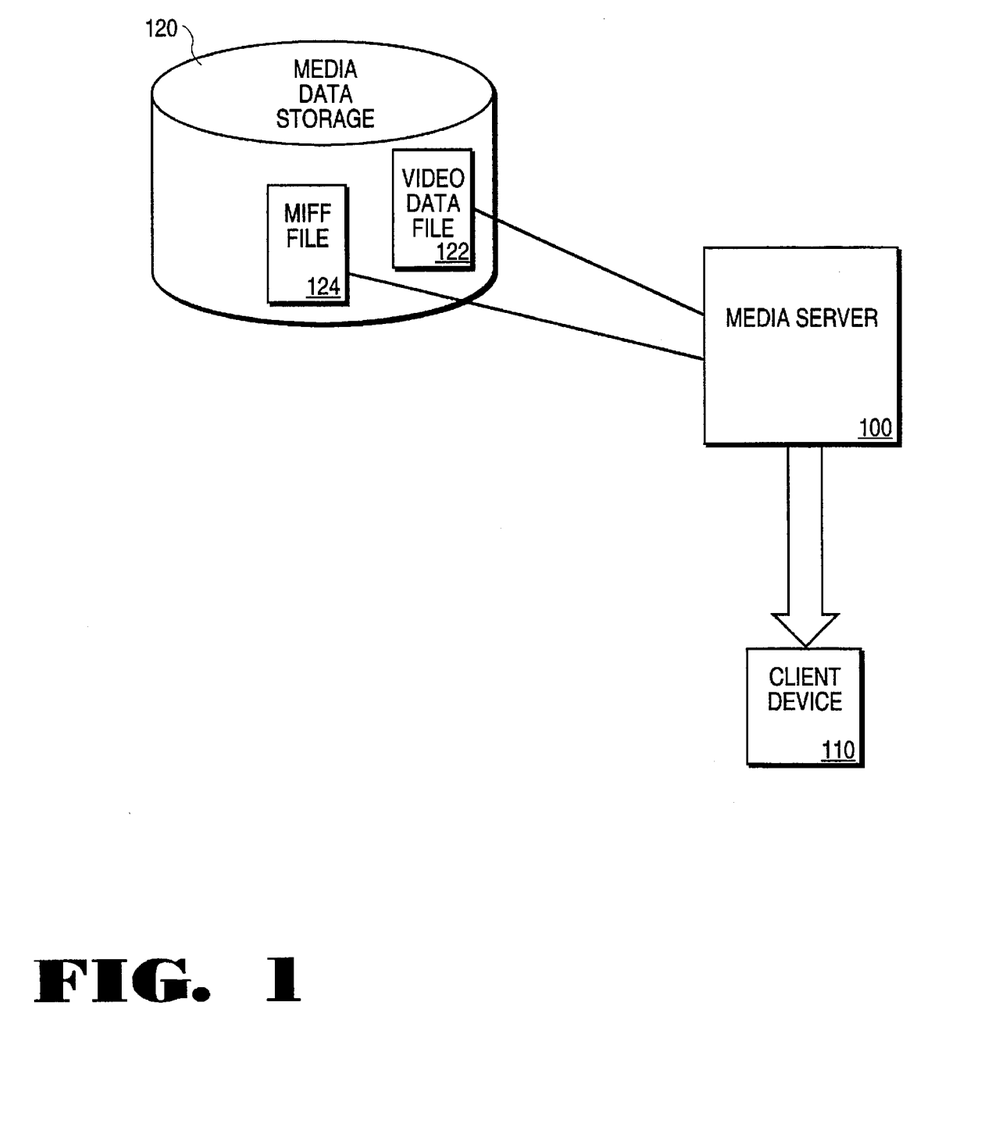
FIG. 1 illustrates the system architecture of the present invention.

Referring now to FIG. 1, a typical system architecture in which the present invention is used is illustrated. In this architecture, a media server 100 is coupled to a client device 110. Media server 100 is a computer based system supporting the manipulation and processing of video streams stored in video data files 122 on media data store 120. Media data store 120 can be any of a variety of conventional mass storage devices such as hard disk or CD ROM devices as well known in the art. The media data store 120, coupled to media server 100, provides media server 100 with a source of video data streams. These video data streams are retrieved from media data store 120 by media server 100 and processed for transfer to client device 110 for viewing by a client on a display device. Client device 110 can be a conventional set-top box capable of receiving and displaying video streams.

In the preferred embodiment of the present invention, an additional file is provided on media data store 120 for the storage of video index information in an MIFF format. This MIFF file 124 corresponds to a video data file 122 and provides video index information for video data file 122. The MIFF file 124 is used by media server 100 to query and select portions of the video data file 122 as selected by the client using client device 110. In the manner described in the following sections, the present invention provides a means and method for encoding video index information into MIFF file 124 in a manner conveniently generated and searched.

A full featured multimedia service requires the visual navigation and the content-based search and retrieval of the video data. Interpreting the content of a video stream from the moving scene, either the real life scene or the digital motion video, is what a human does by her nature; but, it is a great challenge for the digital processors. As the new age of information processing promises to bring to the world the visual richness of the media along with the nonlinearity of information access and content-based services, the challenge of providing additional information along with the video data itself to enable content-based retrieval still beyond the reach of the prior art. The present invention is targeted to meet this challenge.

The present invention approaches the problem with an entirely new technology that allows the creation and processing of the video index. This video index enables content-based retrieval and nonlinearity of video navigation. A video index, as an index in general, provides additional information for processing the media stream. The representation and the processing of a video, index is the key. Prior art systems have attempted various ways of adding video content information. These efforts include attaching keywords to the video streams or the segments of the video streams and abstracting the media data into a frame-based knowledge or expert system.

The present invention represents the video index in an entirely new way, a way that preserves the nature of the video data itself. The video index created by the present invention is a time-based object-oriented visual stream with the volume of the data greatly reduced. Targets or objects can be fully defined and the relationships between targets or objects can be inferred at service time, through the fact that the index preserves the characteristics of the original video stream.

Content-based retrieval is the key to the video services on the information superhighway. The video index of the present invention enables content-based video retrieval. The representation and generation of the video index are the deciding factors in this approach. The video index, the additional information for the video, is tightly related to the video itself; thus, understanding the video as media data is important.

The Syntax and Semantics of the Video

The video has its own syntax and semantics. As a time-based continuous stream, time is the first factor that comprises the syntax of the video stream at a particular unit of time. Time defines the temporal dimension. In a two dimensional pixel-based image, the x and y position of the image are the other two factors that comprise the syntax of the video. The x, y position defines the spatial dimension. A video stream is therefore defined as a series of triples <time, position x, position y>, while time is any valid value within the duration of the video, and position x and position y are any valid values within the video frame resolution in pixels.

The semantics of the video consists of identities and relationships between identities. An identity in the video lives within the time duration and space range of the video. The identity has its own identification and properties. An identity interacts with another identity in both spatial and temporal dimensions. Links from one identity to another are usually contained in the semantics of the video.

The Representation of Video Index

The present invention represents the video index in the preservation of the syntax and semantics of the video. The preservation of the video semantics makes the content-based retrieval possible. The time and space dimensions of the video data are fully preserved in the video index. An identity in the video data is represented as a target in the video index.

A target in the present invention is a representation of a physical identity that lives in the duration of the video and interacts with other identities. A physical identity can be an outfit in a Nicole Miller fashion video, a tennis ball in a Wimbledon championship video, or Harrison Ford in the movie *Fugitive*. Properties can be attached to the targets, allowing the target-to-target navigation. The motion of the targets is fully preserved in the video index, and so are the spatial and temporal relationships between targets. This preservation acts as the ground for generating the content-based query on the fly.

Figure 3:
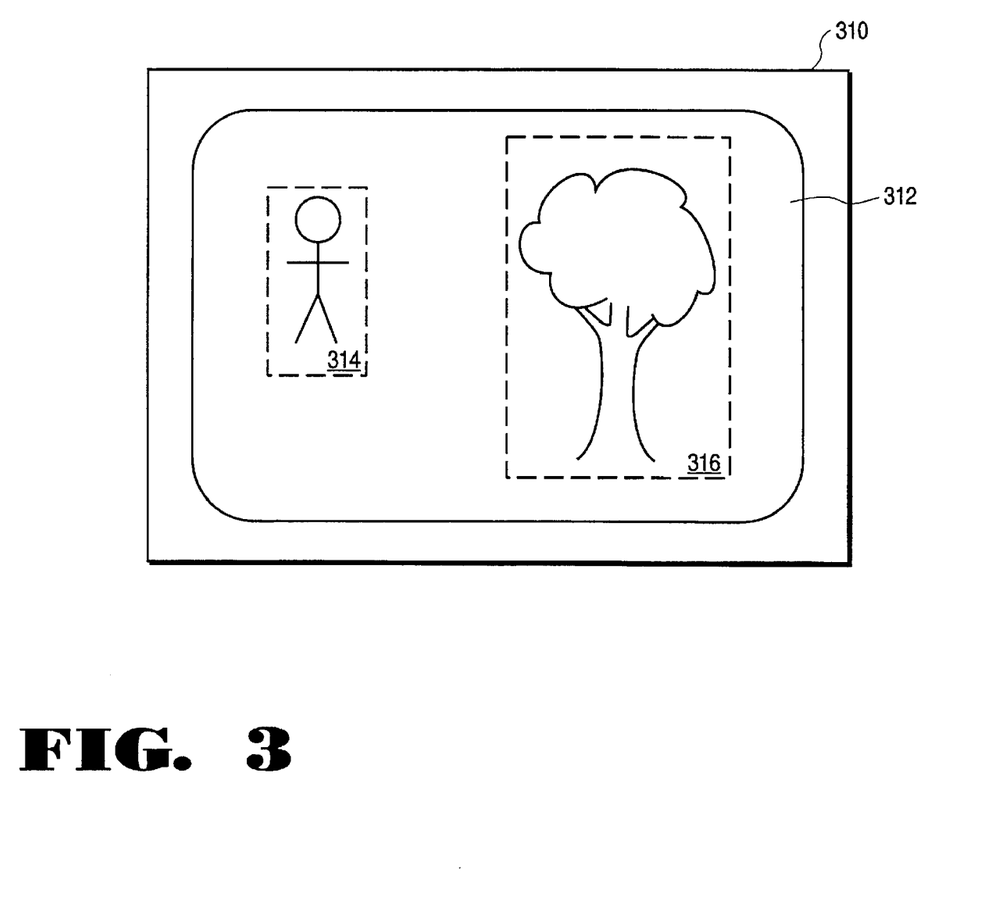
FIG. 3 illustrates an example of objects in a video frame being indexed into targets in a MIFF file.

Referring now to FIG. 3, a sample video frame 312 as displayed on a display device 310 is illustrated. Sample video frame 312 comprises a first identity or object 314 illustrated in FIG. 3 as a stick figure of a man. Video frame 312 includes a second identity or object 316 represented as the image of a tree. Using a variety of techniques, an individual performing the video indexing operation of the present invention identifies object 314 either by drawing a region around the desired object or by using more sophisticated image processing techniques to differentiate the pixels of a particular object from the pixels of other objects or the background image. Once object 314 is identified by an individual performing video indexing, a set of information pertaining to the object (target chunk) is created for object 314. This target chunk identifies the object 314 and provides a means for inputting additional information which further describes the target. Other objects, such as object 316 can be similarly identified within video frame 312. Other target chunks are created for each of these identified objects. In this manner, a plurality of target chunks are created, each of which correspond to an object identified on a video frame by an individual performing video indexing.

The Media Index File Format (MIFF)

The present invention stores the video index in a portable and extensible file format called Media Index File Format (MIFF). MIFF is interchangeable cross various file systems and platforms, and is independent of the internal index representation. MIFF is designed to store indexing information for a variety of media types, such as motion video, audio stream, and animation sequences, in a variety of index representations including: text, bitmap, geometric shape and combinations of the above. It will be apparent ot those of ordinary skill in the art that other media types and representations may be used with the video index and file format defined herein.

The MIFF Structure

The present invention defines the exact format for storing a time-based object-oriented video index, and provides a complete access toolkit for writing, reading and modifying MIFF. The MIFF format is partitioned into several sections or chunks. The main chunks are: Format Chunk, Index Chunk, Media Chunk, Segment Chunk, Target Chunk, and Index Representation Chunk. Each chunk starts with the chunk id that uniquely identifies the chunk type, followed by the size of the chunk. This arrangement allows MIFF readers to skip unrecognized or irrelevent chunks. A MIFF starts with a format chunk, and contains any number of index chunks in any order. Each index chunk contains a media chunk, a segment chunk, a plurality of target chunks, and an index representation chunk in any order. The hierarchy of the chunk structure follows:

| Chunk Name | Description of the Chunk |
| --- | --- |
| Format Chunk: | contains at least one index chunk |
| Index Chunk: | contains the links to its sub chunks |
| Media Chunk: | media specific information |
| Segment Chunk: | segments of media serving as the structural index |
| Target Chunk: | indexed targets or objects in the video stream |
| Rep Chunk: | representation of indexing information |

Figure 2:
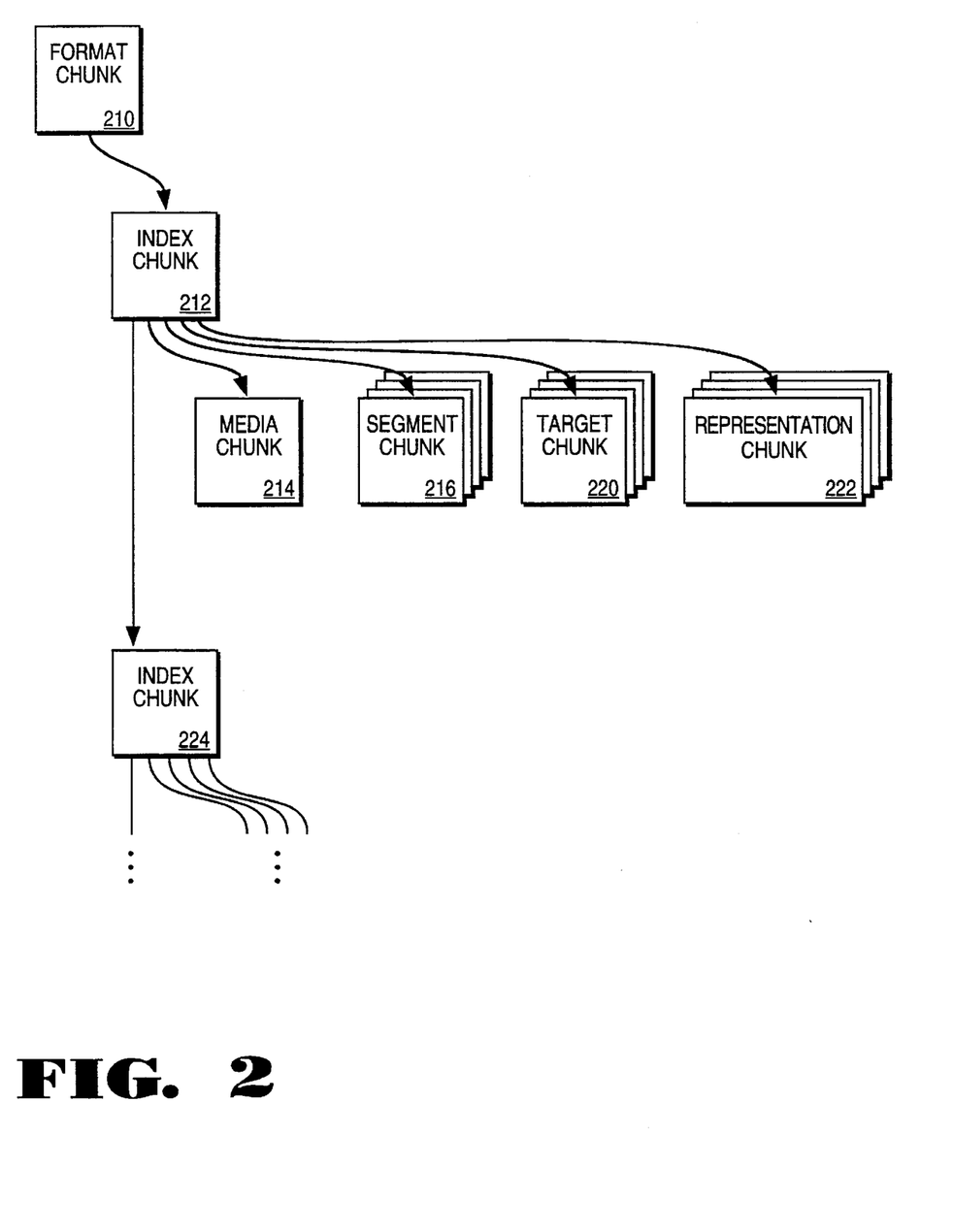
FIG. 2 illustrates the MIFF file format.

Referring now to FIG. 2, a block diagram illustrates the structure of the MIFF file format. The MIFF file format comprises format chunk 210 which points to a first index chunk 212. Index chunk 212 links other index chunks 224 with a media chunk 214, a segment chunk 216, a target chunk 220, and a representation chunk 222. As illustrated in FIG. 2, segment chunk 216, target chunk 220, and representation chunk 222 may comprise a plurality of corresponding chunks. The specific components of each of these chunks is described in detail below.

The MIFF Chunks

The following section explains each MIFF chunk in detail as defined in the preferred embodiment of the present invention. It will be apparent to those of ordinary skill in the art that variations to this basic structure are possible without departing from the scope of the present invention.

The Format Chunk:
  The required information in the format chunk contains:
    the format chunk identification, which is the ASCII value of the string "MIFF."
    the version number of the MIFF writer, for example, the current version is 1.0.0.0.
    the offset to the first index chunk.
  The optional information in the format chunk can contain:
    byte-order.
    the platform and file system in which the MIFF is generated.
    the informative data about the date, the creator, or modification of the MIFF file.

The Index Chunk:
  The required information in the index chunk contains:
    the index chunk identification, which is the ASCII value of the string "INDEX" standing for "INDEX."
    offset to the next index chunk.
    offset to the media information chunk of this index chunk.
    offset to the segment definition chunk of this index chunk.
    offset to the target definition chunk of this index chunk.
    offset to the index representation definition chunk of the index chunk.

The Media Chunk:
  The required information in the media definition chunk contains:
    the media chunk identification, which is the ASCII value of the string "MEDI" standing for "MEDIA."
    the identification of the media, for example, can be a 256-character long text string, such as the file name of the media if the media resides in a particular file system.
    the media type, for example, it can be a video, a sound or an animation etc.
    the media dimension, for example, the frame width, the frame height, and frame count comprise the dimensions of a video stream, while the sampling rate, the sample size, and the sample encoding comprises the dimensions of an audio stream.
    the media information, a variable length of user-defined data attached to the media.

The Segment Chunk:
  The required information in the segment definition chunk contains:
    the segment chunk identification, which is the ASCII value of the string "SEGM" standing for "SEGMENT."
    the number of the segment in the media, for each segment, it defines the following items:
      the identification of the segment, for example, it can be a text string.
      the user-defined information of variable length.
      the user-defined script of variable length.
      the range of the segment in terms of the media unit.

The Target Chunk:
  The required information in the target definition chunk contains:
    the target chunk identification, which is the ASCII value of the string "TARG" standing for "TARGET."
    the number of targets in the media, for each target, it defines the following items:
      the internal target identification as cross-referenced within MIFF.
      the identification of the target that is unique within the current media index, for example, it can be a 256-character long text string.
      the user-defined information of variable length.
      the user-defined script of variable length.
      the occurrence of the target in terms of the current media unit.

The Representation Chunk:
  The required information in the representation definition chunk contains:
    the representation chunk identification, which is the ASCII value of the string "GRID", an internal representation of the video index.
    the number of index representations, grids for the video index, for example, and for each grid, it defines the following:
      the time counter, in terms of the media unit, for video, it's usually a frame number.
      the list of targets that reside at this timer counter.
      the actual grid representation, a bitmap, its resolution, and each pixel of the bitmap represents a list of targets ordered by depth.

| A MIFF Example | |
|---|---|

The Format Chunk:
| | |
|---|---|
| "MIFF": | the unique identification of the format |
| 1.0.0.0: | the version number |
| <a long>: | the offset to the first index chunk |
| "MM": | the Motorola byte order ("II" for Intel byte order) |

The Index Chunk:
| | |
|---|---|
| "INDX": | the index chunk identification |
| <a long>: | offset to the next index chunk |
| <a long>: | offset to the media information chunk of this index chunk |
| <a long>: | offset to the segment definition chunk of this index chunk |
| <a long>: | offset to the target definition chunk of this index chunk |
| <a long>: | offset to the index representation definition chunk of this index chunk |

The Media Chunk:
| | |
|---|---|
| "MEDI": | the media chunk identification |
| "Movie:Action:Fugitive" | the media identification, a video file name |
| VIDEO: | the media type |
| FRAME: | the media unit |
| <long, long, long>: | the media dimension, the frame width, the frame height in pixels and the number of frames |
| USER_INFO: | the user-defined information |

The Segment Chunk:
| | |
|---|---|
| "SEGM" | the segment chunk identification |
| <(long)7>: | the number of segments |

<segment_0>:
| | |
|---|---|
| "Movie:Action:Fugitive:segment0": | the segment identification |
| <0, 12304>: | the range of the segment in frames. |

<segment_1>:
| | |
|---|---|
| "Movie:Action:Fugitive:segment1": | the segment identifcation |
| <12304, 26799>: | the range of the segment in frames. |

. . . etc.

The Target Chunk:
| | |
|---|---|
| "TARG" | the target chunk identification |
| <(long)19>: | the number of targets |

<target_0>:
| | |
|---|---|
| "T000": | the internal unique cross reference identification |
| "Movie:Action:Fugitive:target0": | the target identification or name. |
| <234, 5678>: | the first occurrence in frames |
| <8909, 12345>: | the second occurrence in frames. |

. . . etc.

<target_1>:
| | |
|---|---|
| "T001": | the internal unique cross reference identification |
| "Movie:Action:Fugitive:target1": | the target identification or name |
| <134, 5656>: | the first occurrence in frames |
| <8909, 12344>: | the second occurrence in frames |

. . . etc.

The Rep Chunk:
| | |
|---|---|
| "GRID" | the grid representation chunk identification |
| <(long)1119>: | the number of grids |

<grid_0>:
| | |
|---|---|
| <123>: | the frame number at which the grid is indexed |
| "T007", "T015": | the targets that reside at this frame number |
| <40, 30>: | the resolution of grid bitmap in pixels |
| < . . . . >: | the bitmap bytes, the byte value of each pixel represents a list of targets around that pixel, while only one target is visible and the rest are invisible targets |

<grid_1>:
| | |
|---|---|
| <156>: | the frame number at which the grid is indexed |
| "T011","T012","T002": | the targets that reside at this frame number |
| <20, 15>: | the resolution of grid bitmap in pixels |
| < . . . . >: | the bitmap bytes, the byte value of each pixel represents a list of targets around that pixel, while only one target is visible and the rest are invisible targets. |

It will be apparent to those of ordinary skill in the art that any number of index, segment, target, and/or representation chunks may be included in a particular MIFF file. Further, information other than that specified herein may be included in each of the defined chunks without departing from the scope of the present invention.

Operation of the Preferred Embodiment

Figure 4:
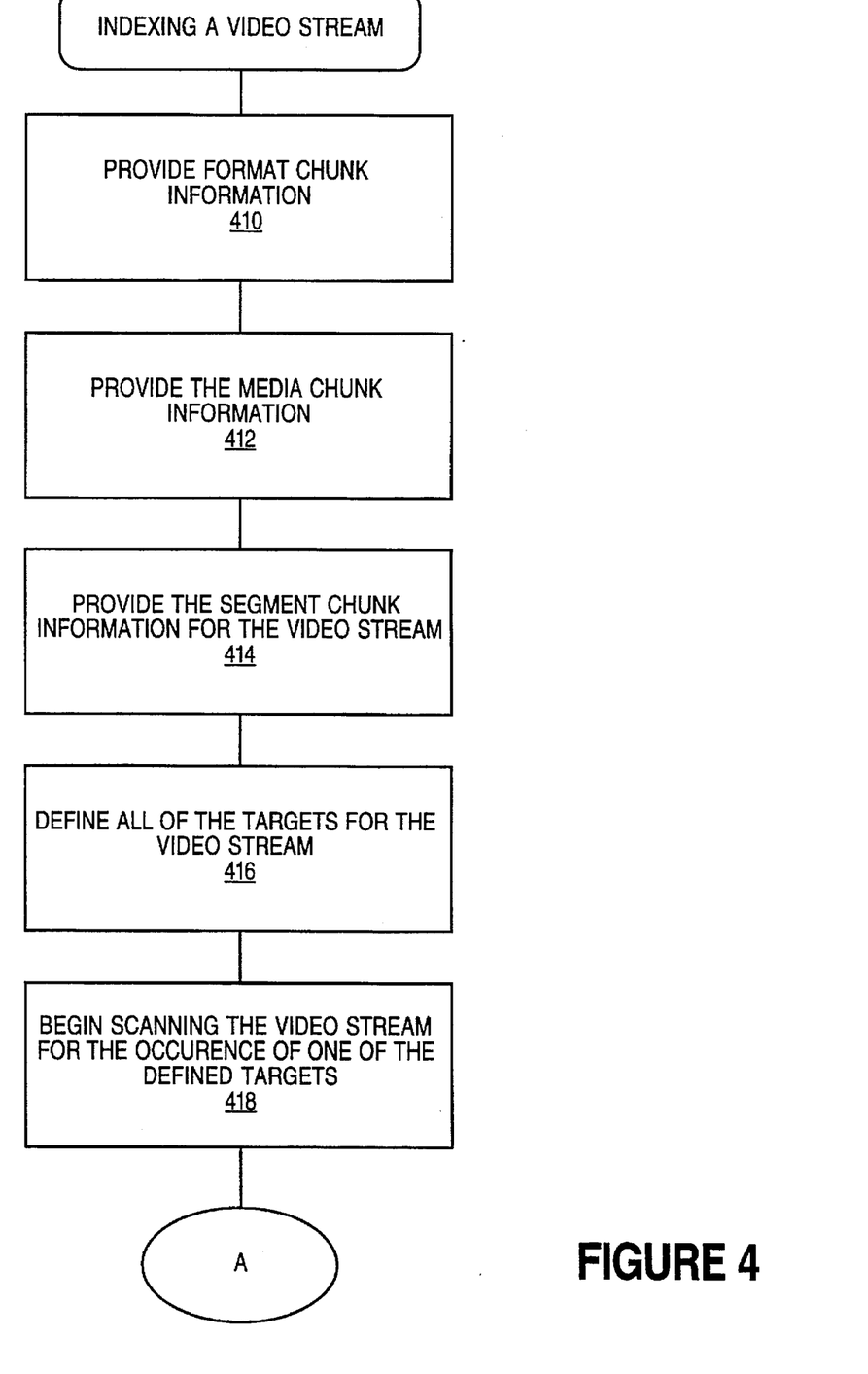
FIGS. 4–7 are flowcharts illustrating the processing logic of the present invention.

Referring now to FIG. 4, a flow chart illustrates the initial processing performed by a user indexing a video stream. In a first series of steps, a video indexer provides format chunk information in processing block 410. This format chunk information includes a version number of the MIFF writer and other optional format chunk information including the byte order of the information, an identification of the platform and file system in which the MIFF file was generated and other information about the date, creator, or modification of the MIFF file. Next, the media chunk information is provided by the video indexer in processing block 412. The media chunk information includes an identification of the media, an identification of the media type, the media dimension, and other information related to the particular medium. The video indexer then provides segment chunk information in processing block 414. Segment chunk information is used to define, if needed, a series of segments for partitioning the video stream into one or more portions. The segment chunk information includes an identification of the segment, user defined information pertaining the segment, and an identification of the range or length of the segment in terms of the media unit. In processing block 416, the video indexer defines all of the targets for the video stream. These targets are defined by reviewing the video stream frame-by-frame for particular objects of interest as illustrated by example in FIG. 3. A target chunk is created in processing block 416 for each of the objects identified by the video indexer. Additional target information for each target may also be provided within the associated target chunk. Next, the video stream is scanned for the occurrence of one or more of the previously defined targets in processing block 418. Processing for indexing a video stream then continues through the bubble labeled A illustrated in FIG. 5.

Figure 5:
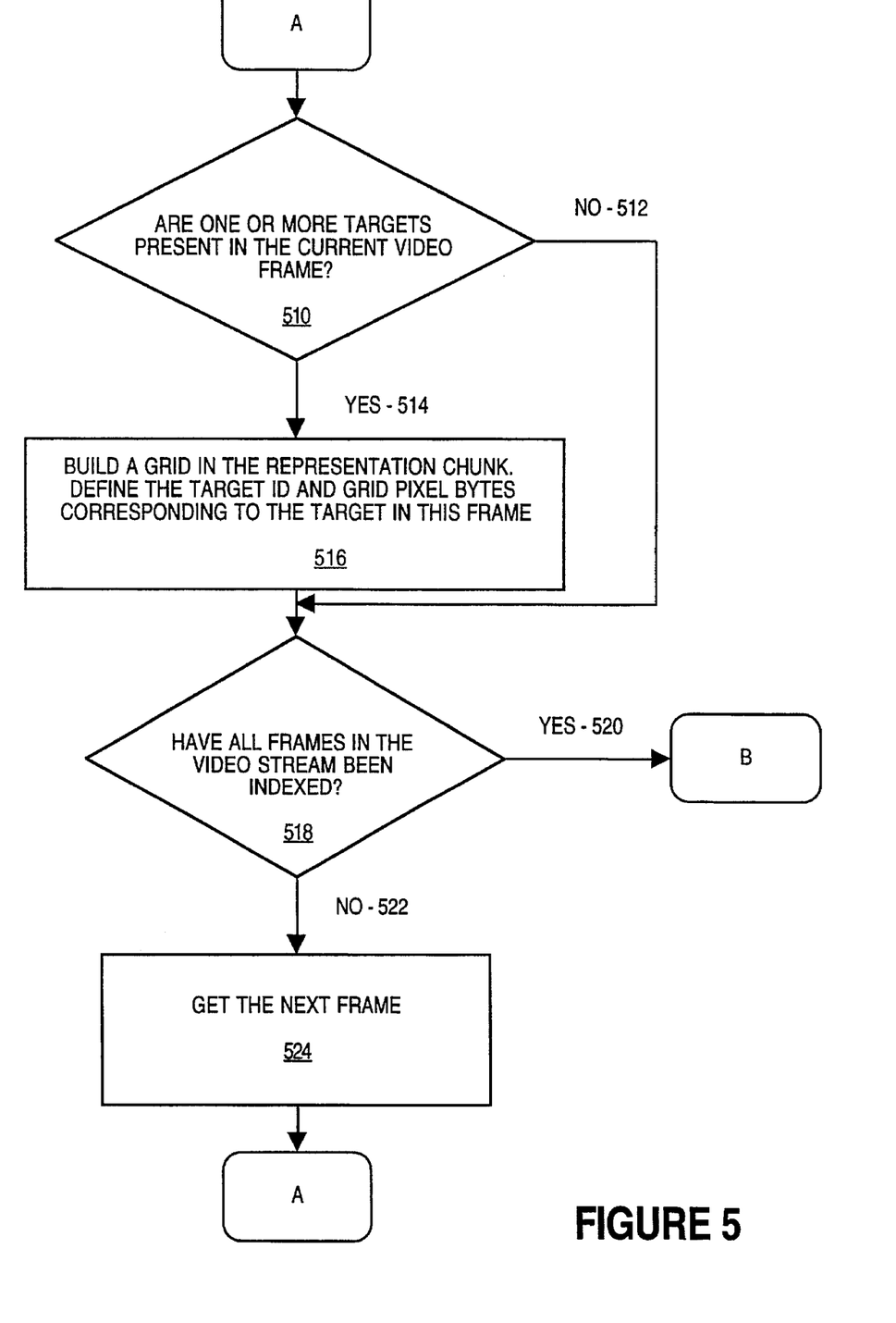

Referring now to FIG. 5, processing for indexing of video stream continues through the bubble labeled A. As the video indexer scans through the video stream frame-by-frame, previously defined targets of interest may appear in the current video frame. If such a target of interest appears in the current video frame, processing path 514 is taken to processing block 516 where a grid in the representation chunk is built. This grid defines information related to the presence of a target of interest in the present frame. The identifier of this target and the grid pixel bytes corresponding to the target in this frame are recorded in the representation chunk in processing block 516. If all of the frames in the video stream have been indexed, processing continues at the bubble labeled B illustrated in FIG. 6. Otherwise, the next frame is retrieved in processing block 524 and processing continues at the top of FIG. 5 through the bubble labeled A where the next frame is scanned for targets of interest.

Figure 6:
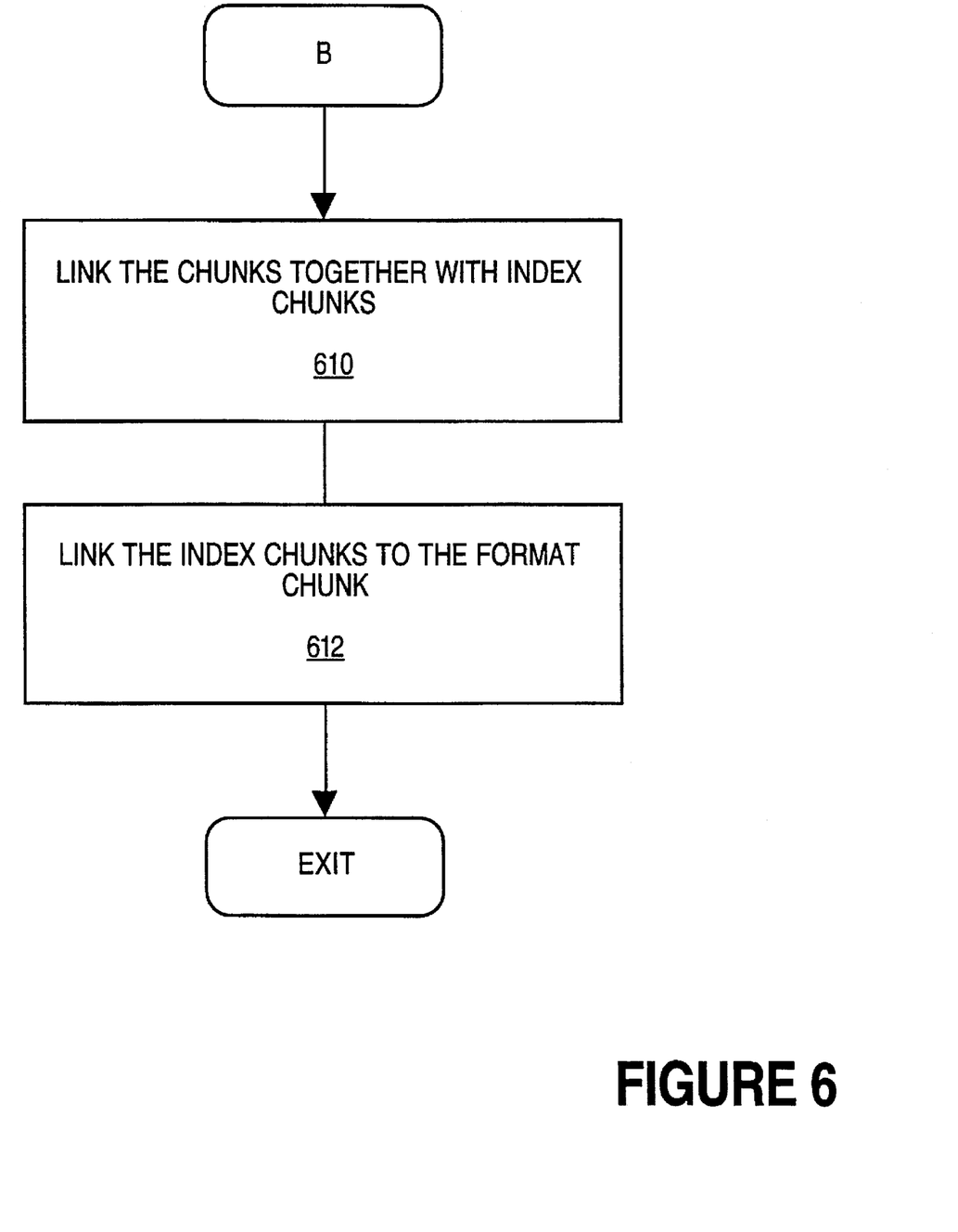

Referring now to FIG. 6, processing for indexing a video stream continues through the bubble labeled B. In this case, the video stream has been scanned and all representation chunks have been created. All chunks for the video index are linked together with index chunks in processing block 610. The index chunks are then linked to the format chunk in block 612. In this manner, an MIFF file is created for the indexed video stream. Processing then terminates through the exit bubble illustrated in FIG. 6.

Figure 7:
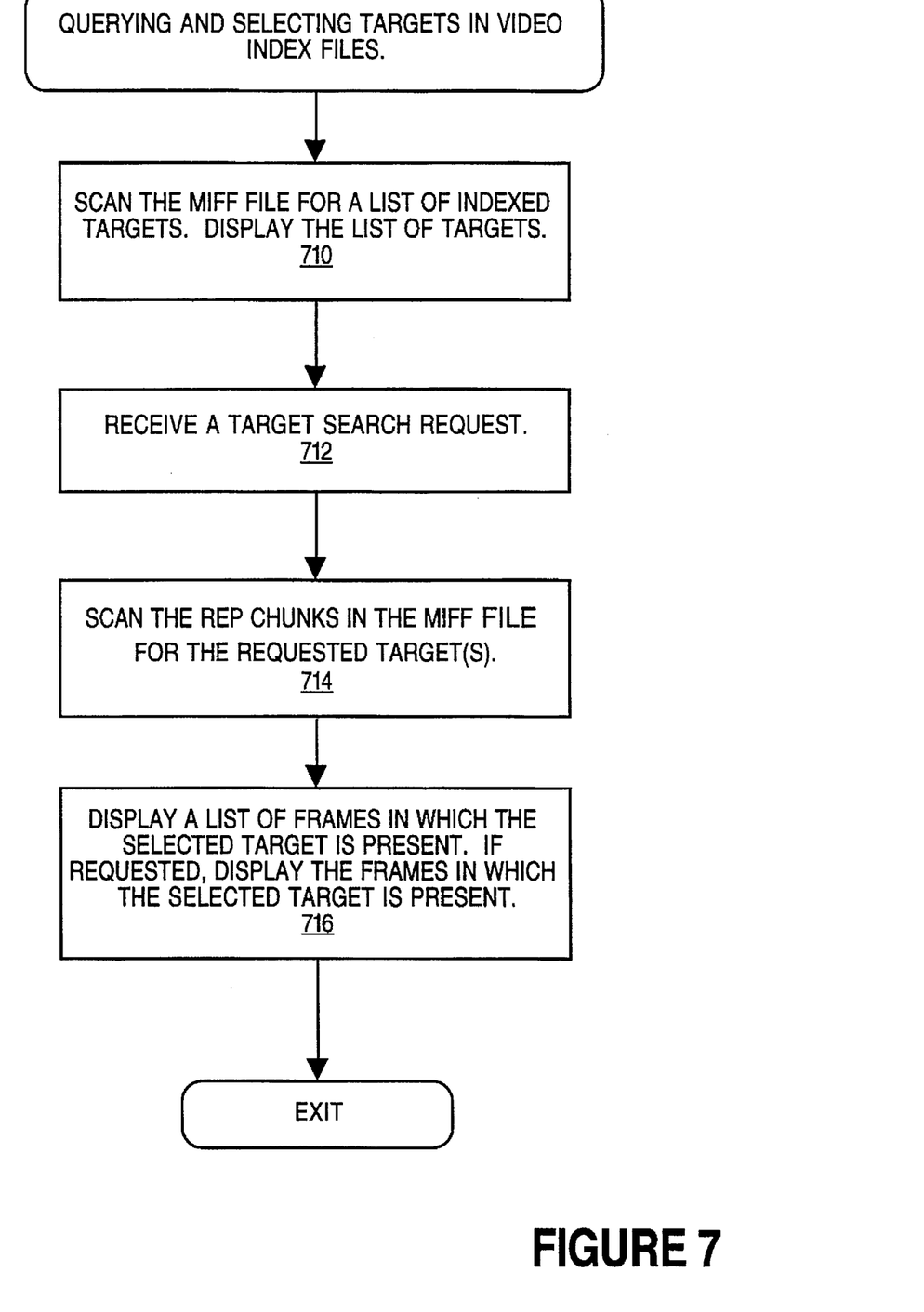

Referring now to FIG. 7, processing logic is illustrated for querying a video index file in a MIFF format and for selecting particular targets of interest. In processing block 710, the MIFF file is scanned for a list of indexed targets. This list of indexed targets is displayed for a user in processing block 710. The user may then identify a particular target or set of targets for searching in processing block 712. Various other parameters may be used to qualify a particular search. These parameters may include a specification of a particular segment of frames in the video stream, a particular time range within the video stream, or other search qualification criteria. Once the search request is received, the representation chunks in the MIFF file are scanned for the presence of the requested target or targets (processing block 714). If a corresponding set of targets is found, a list of frames in which the selected targets were found is displayed in processing block 716. If requested, the frames in which the requested targets were found are displayed for the user in processing block 716. Processing for querying a video index file then terminates through the exit bubble illustrated in FIG. 7.

Thus, a system and method for indexing a multimedia stream to provide information regarding the content of the stream is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A computer-implemented method for creating a multimedia index for a multimedia information stream to allow for content based searching of said multimedia information stream via said multimedia index, said multimedia information stream comprising a series of multimedia frames, each of said multimedia frames including at least one object, said computer-implemented method comprising the steps of:

defining one or more content based targets in at least one of said multimedia frames, each of said one or more content based targets including said at least one object;

associating attributes with each of said one or more content based targets, said associated attributes including a target identifier and user-defined information; and defining said multimedia index in a portable and extensible file format for said multimedia information stream, said multimedia index comprising index information which includes said associated attributes of said one or more content based targets.

2. The computer-implemented method as claimed in claim 1 wherein said step of defining said multimedia index includes the step of creating a multimedia index file, said multimedia index file including said index information and formatting information.

3. The computer-implemented method as claimed in claim 2 wherein said multimedia index file includes said index information and said formatting information for a plurality of media types including video, audio and animation sequences.

4. The computer-implemented method as claimed in claim 1 wherein said multimedia index includes media information which comprises a media identification, a media type, a media dimension and user-defined media data.

5. The computer implemented method as claimed in claim 1 wherein said multimedia index includes segment information which comprises a segment identification and user-defined segment data.

6. The computer-implemented method as claimed in claim 1 wherein said multimedia index includes representation information which comprises a representation identification and grid information.

7. The computer-implemented method according to claim 3 wherein said at least one object in said one or more content based targets allows for said content based searching of said multimedia information stream using said multimedia index representing said content based targets.

8. An apparatus for creating a multimedia index for a multimedia information stream, said apparatus allowing for content based searching of said multimedia information stream via said multimedia index, said multimedia information stream comprising a series of multimedia frames, each of said multimedia frames including at least one object, said apparatus comprising:

a media server for defining one or more content based targets in at least one of said multimedia frames, each of said one or more content based targets including said at least one object;

said media server associating attributes with each of said one or more content based targets, said associated attributes including a target identifier and user-defined information; and said media server defining said multimedia index in a portable and extensible file format for said multimedia information stream, said multimedia index comprising index information which includes said associated attributes of said one or more content based targets.

9. The apparatus as claimed in claim 8 wherein said media server also creates a multimedia index file, said multimedia index file including said index information and formatting information.

10. The apparatus as claimed in claim 9 wherein said multimedia index file includes said index information and said formatting information for a plurality of media types including video, audio and animation sequences.

11. The apparatus as claimed in claim 8 wherein said multimedia index includes media information which comprises a media identification, a media type, a media dimension and user-defined media data.

12. The apparatus as claimed in claim 8 wherein said multimedia index includes segment information which comprises a segment identification and user-defined segment data.

13. The apparatus as claimed in claim 8 wherein said multimedia index includes representation information which comprises a representation identification and grid information.

14. The apparatus according to claim 8 wherein said at least one object in said one or more content based targets allows for said content based searching of said multimedia information stream using said multimedia index representing said content based targets.

15. An apparatus for creating a multimedia index for a multimedia information stream, said apparatus allowing for content based searching of said multimedia information stream via said multimedia index, said multimedia information stream comprising a series of multimedia frames, each of said multimedia frames including at least one object, said apparatus comprising:

means for defining one or more content based targets in at least one of said multimedia frames, each of said one or more content based targets including said at least one object;

means for associating attributes with each of said one or more content based targets, said associated attributes including a target identifier and user-defined information;

means for defining said multimedia index in a portable and extensible file format for said multimedia information stream, said multimedia index comprising index information which includes said associated attributes of said one or more content based targets.

16. The apparatus as claimed in claim 15 wherein said means for defining said multimedia index includes a means for creating a multimedia index file, said multimedia index file including said index information and formatting information.

17. The apparatus according to claim 15 wherein said at least one object in said one or more content based targets allows for said content based searching of said multimedia information stream using said multimedia index representing said content based targets.

18. An article of manufacture comprising a computer readable medium having computer instructions embodied therein for causing a computer system to create a multimedia index for a multimedia information stream, said multimedia index allowing for content based searching of said multimedia information stream via said multimedia index, said multimedia information stream comprising a series of multimedia frames, each of said multimedia frames including at least one object, said computer instructions in said article of manufacture causing said computer system to perform the steps of:

defining one or more content based targets in at least one of said multimedia frames, each of said one or more content based targets including said at least one object;

associating attributes with each of said one or more content based targets, said associated attributes including a target identifier and user-defined information; and defining said multimedia index in a portable and extensible file format for said multimedia information stream, said multimedia index comprising index information which includes said associated attributes of said one or more content based targets.

19. The article of manufacture as claimed in claim 18 wherein said step of defining said multimedia index includes the step of creating a multimedia index file, said multimedia index file including said index information and formatting information.

20. The article of manufacture as claimed in claim 19 wherein said multimedia index file includes said index information and said formatting information for a plurality of media types including video, audio and animation sequences.

21. The article of manufacture as claimed in claim 18 wherein said multimedia index includes media information which comprises a media identification, a media type, a media dimension and user-defined media data.

22. The article of manufacture as claimed in claim 18 wherein said multimedia index includes said information which comprises a segment identification and user-defined segment data.

23. The article of manufacture as claimed in claim 18 wherein said multimedia index includes representation information which comprises a representation identification and grid information.

24. The article of manufacture according to claim 18 wherein said at least one object in said one or more content based targets allows for said content based searching of said multimedia information stream using said multimedia index representing said content based targets.

* * * * *